June 9, 1931. J. LINK 1,809,173
DIRIGIBLE HEADLIGHT
Filed April 21, 1930
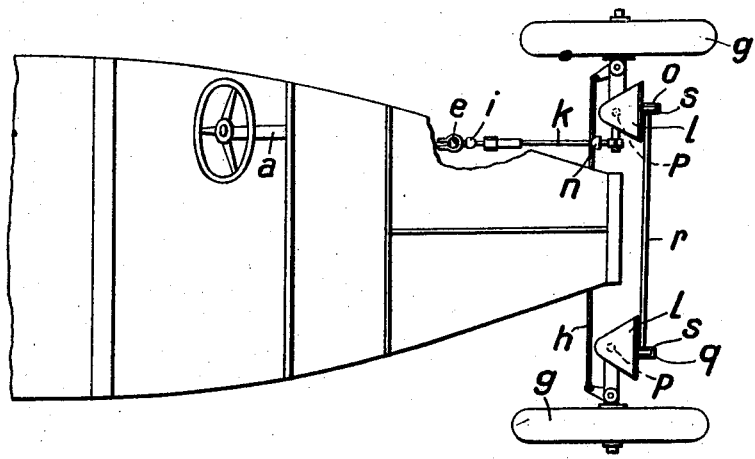
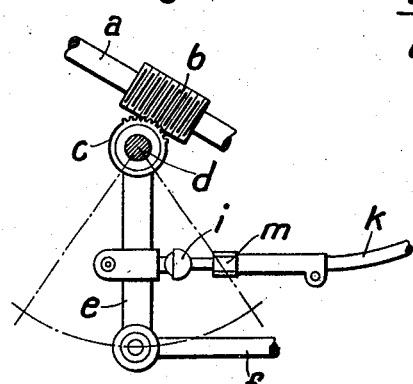
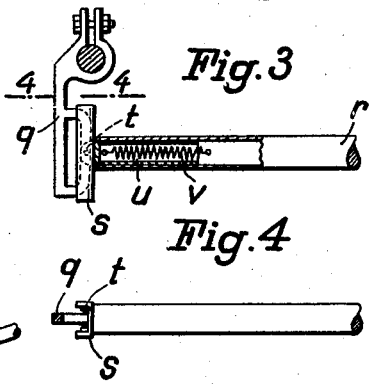
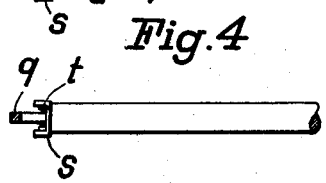
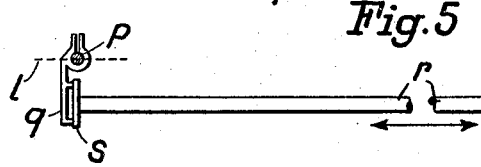
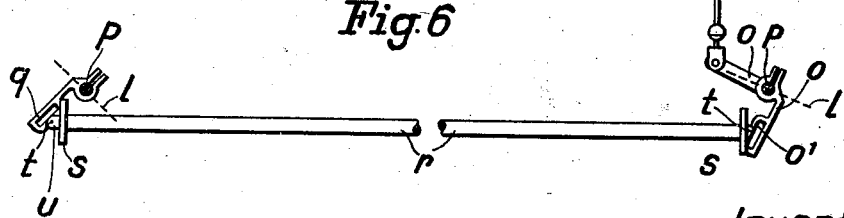
Inventor:

Patented June 9, 1931

1,809,173

UNITED STATES PATENT OFFICE

JOHANN LINK, OF BRACHBACH/SIEG, GERMANY

DIRIGIBLE HEADLIGHT

Application filed April 21, 1930, Serial No. 446,149, and in Germany April 24, 1929.

This invention relates to a mechanism for automatically adjusting the two front head lamps of motor driven vehicles, so that when the car is running along a curved portion of a road the head lamp on the inner side of the curve is oscillated with a greater angle of oscillation than the other head lamp, and the curve as well as the remaining portion of the road are well lighted.

The improvement is characterized in that between two levers connected to the two pivot axles of the head lamps a rigid rod is arranged having a guide element on either side and cooperating with the two levers. When one of the levers, connected with the steering wheel, is oscillated in the one or other direction, this movement is transmitted by the rod upon the other lever. According to the amplitude and direction of the oscillating movement the distance between the pivot axle and the hinge point between lever and guide element is of different length, wherefrom results the different inclinations of the positions of the two head lamps.

An embodiment of the invention is illustrated by way of example in the accompanying drawings in which:

Fig. 1 shows in top plan view the front portion of a motor car.

Fig. 2 shows the connection of the steering pillar with a driving lever for the adjusting device.

Fig. 3 is a cross section through a pivot axle of a head lamp with the lever mounted on the same.

Fig. 4 is a section on line 4—4 of Fig. 3.

Figs. 5 and 6 show the adjusting elements in top plan view in two different positions.

A worm $b$ mounted on the steering pillar $a$ oscillates through a spur wheel $c$ a lever $e$ pivotable around a vertical axle $d$. The lever $e$ is connected by an arm $f$ with the connecting rod $h$ acting upon the wheels $g$, and by a ball joint $i$ with a rod $k$ designed to be used for the adjusting of the head lamps $l$. A shock absorber $m$ of known type, mounted behind the ball joint $i$, prevents the slight movements of the steering pillar, unavoidable when the car is running, from being transmitted upon the head lamps. As shown in Figs. 1, 4 and 5 the rod $k$ is connected by a second ball joint $n$ with a two-armed lever $o$, adjustably mounted on the pivot axle $p$ of the head lamp, the other arm of lever $o$ having a fork shaped extension $o'$. A similarly constructed but one armed lever $q$ is mounted on the pivot axle of the second head lamp, and a rigid tube $r$ is arranged between the levers $o$ and $q$. This tube $r$ carries, as shown in Figs. 3 and 4, at each end a guide element $s$ of U-shaped cross section. In this element $s$ the fork shaped extension $o'$ can slide, which is hingedly connected by a stud $t$ with a short tubular extension $u$ shiftable in the tubular rod $r$. A spiral spring $v$ is attached at one end to the said tubular extension $u$, the other end of said spiral spring being attached to the tube $r$.

When the car is running straight ahead all elements are in the position shown in Fig. 5. When then the two front wheels $g$ are veered, for instance to the right, the tubular rod $r$ pulls the lever $o$ into the position shown in Fig. 6. The head lamp on this side assumes the position indicated in dash line on the right hand side of Fig. 6. The front edge of fork $o'$ touches the guide element $s$ so that a great effective lever arm is produced. The lever $q$ is consequently oscillated by the tube $r$ with a very great amplitude, and the second head lamp is adjusted at a much greater angle, as indicated in dash line on the left hand side of Fig. 6.

I claim:

1. A mechanism for automatically turning the front head lamp of motor cars into the direction of travel so that when the car is running along in a curve of the road the head lamp on the inner side of the curve oscillates at a greater amplitude than the other head lamp, comprising in combination with the pivot axles of the head lamps, a two armed lever on the pivot axle of one of said head lamps, a one armed lever on the pivot axle of the other head lamp, a fork shaped extension on each of said pivot axle levers, a rigid tube loosely mounted between the free ends of said levers, and a guide element on each end of said rigid tube on which said fork shaped extensions of said pivot axle levers bear.

2. A mechanism as specified in claim 1, comprising in combination with the rigid connecting tube and with the pivot axle levers having a forked end, a guide element fixed on each end of said tube, and a spring controlled tubular extension in each end of said tube hingedly connected with the fork shaped end of the corresponding pivot axle lever.

3. A mechanism as specified in claim 1, comprising in combination with the steering pillar and the two armed lever on the pivot axle of one of the head lamps, a system of transmission levers between said steering pillar and said two-armed lever, and a shock absorber inserted in said system.

In testimony whereof I affix my signature.

JOHANN LINK.